United States Patent

[11] 3,596,281

| [72] | Inventor | Eugene H. Lombardi<br>Port Chester, N.Y. |
|---|---|---|
| [21] | Appl. No. | 799,615 |
| [22] | Filed | Feb. 17, 1969 |
| [45] | Patented | July 27, 1971 |
| [73] | Assignee | Ethyl Corporation<br>New York, N.Y. |

[54] FUEL TEST RECORDER
1 Claim, 2 Drawing Figs.

[52] U.S. Cl. .................................................. 346/34,
346/62, 73/35
[51] Int. Cl. .................................................. G01d 9/32
[50] Field of Search .................................................. 346/62, 34;
73/35

[56] References Cited
UNITED STATES PATENTS

| 1,801,291 | 4/1931 | Snavely et al. | 346/62 X |
| 3,327,312 | 6/1967 | Hamilton et al. | 346/49 |
| 3,383,904 | 5/1968 | Jones et al. | 73/35 |
| 3,414,905 | 12/1968 | O'Brien et al. | 346/62 X |

Primary Examiner—Joesph W. Hartary
Attorney—Donald L. Johnson

ABSTRACT: Trace indicator such as chart recorder is arranged to automatically make different mutually distinguishable types of traces under the influence of a special marker signal, to indicate two different types of measurements are being made. A single pen on a chart recorder is in this way used to simultaneously make a trace of test results on different gasolines and identify the individual gasolines.

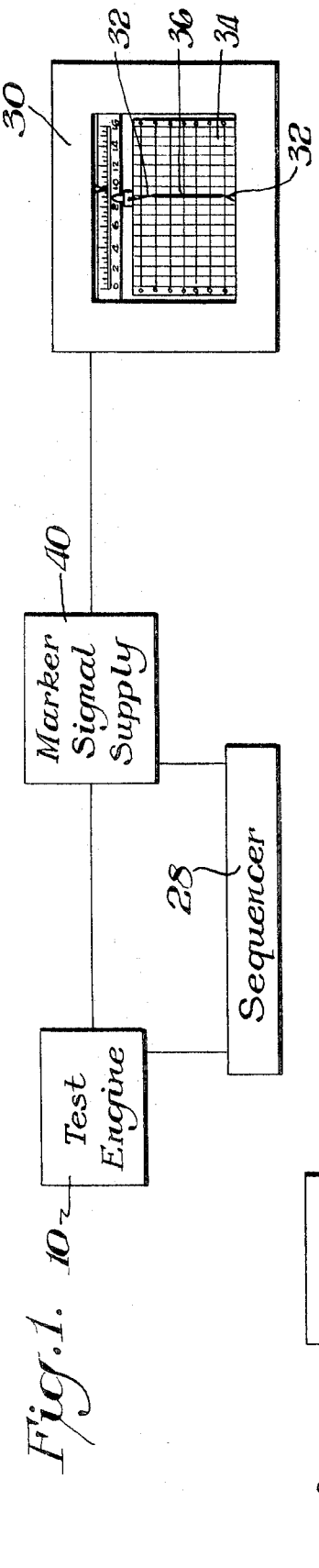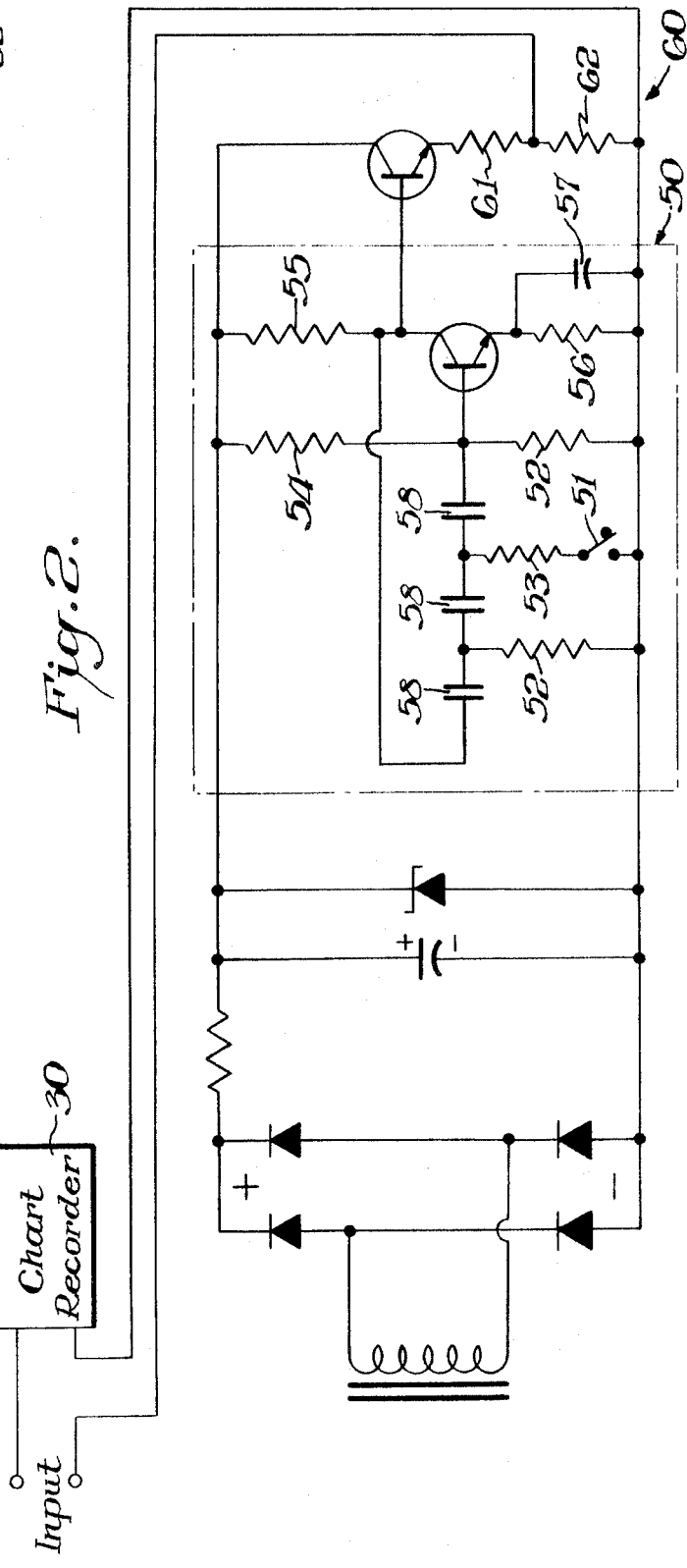

FUEL TEST RECORDER

The present invention relates to test indicators, more particularly indicators that, like chart recorders, make traces of signals supplied to them.

Among the objects of the present invention is the provision of improved indicators that are relatively simple to put together and have greater usefulness.

The foregoing as well as additional objects of the present invention will be more fully understood from the following description of several of its exemplifications, reference being made to the accompanying drawings in which:

FIG. 1 is a block-type illustration of a gasoline testing apparatus having a test indicator pursuant to the present invention;

FIG. 2 is a circuit diagram of a marker signal supply for the apparatus of FIG. 1.

According to the present invention a trace indicator has a writing device connected for actuation by an external electric signal to make a time trace corresponding to that signal, and marking means including a marking signal supply connected for selectively delivering to the writing device a marking signal having fluctuations of sufficient magnitude to significantly broaden the width of the trace and of a frequency sufficient to substantially merge in the broadened trace.

The marking signal supply is generally a generator of marking pulses having a frequency of at least one-half cycle per second. The foregoing combination is particularly effective in making chart records of test results obtained in an automatic fuel testing apparatus that selectably operates on a test fuel or on a reference fuel, and in such combination uses a single tracing showing with trace lines of one width the test results obtained on one fuel, and with trace lines of another width the test results on the other fuel. Such traces are easy to read and are readily distinguished from each other. A single tracing device will in this way make dual tracings.

Two different types of marking signals can also be used to widen the normal trace to two different widths distinguishable from each other, so that three distinguishable kinds of tracings can be made from a single tracing device. Greater numbers of tracings are also obtainable.

Turning now to the drawings, Fig. 1 shows an automatic gasoline testing apparatus as more fully described in connection with FIG. 11 of U.S. Pat. 3,383,904 granted May 21, 1968. This apparatus has a test engine 10 under the control of a sequencer 28 which automatically supplies the engine with a test fuel for prescribed periods of time, and with a reference fuel for other periods of time. A chart recorder 30 is connected to the test engine to make tracings of the test measurements on the respective fuels. The connection to the recorder 30 can be such that the recorder traces the compression ratio of the engine as it is automatically adjusted to keep at a constant level the intensity of the knocking produced as the engine operates. The compression ratio signals are a measure of the height of the test engine's cylinder with respect to its crank case, and are easily provided by a differential transformer having bucking windings physically held by the engine's crank case while a magnetic slug is held by the cylinder in variable position with respect to the windings, all as described in U.S. Pat. 3,184,956 granted May 25, 1965. The alternating signal delivered by the differential transformer can then be rectified to provide a suitable measuring signal for the chart recorder 30.

Alternatively the engine's cylinder can merely hold a variable arm of an AC or DC wheatstone bridge that is otherwise fixed in location, the movement of the arm causing the bridge to produce a corresponding signal for the chart recorder. The engine's signals to the recorder can be in compression ratio values or can be calibrated to give octane number values that the chart recorder traces. If desired the charts of the chart recorder can be so calibrated that the trace gives octane number values although the signals delivered to the recorder are only compression ratio signals.

In the construction of FIG. 1, sequencer 28 also controls a marker signal supply 40 in the circuit from the test engine to the recorder 30. One effective marker signal circuit is shown in FIG. 2 as a transistor phase shift oscillator 50 whose output is connected through a transistor voltage follower stage 60 having an output resistor 62, in series in the circuit from the test engine to the chart recorder. The oscillator has an on-off switch 51 which is operated by the sequencer so that this switch is open when test fuel is supplied to the test engine, and closed when reference fuel is supplied. To this end switch 51 can have its armature connected for magnetic actuation by the winding of solenoid 782 of the control assembly of the above-mentioned FIG. 11.

Very good results have been obtained with the oscillator operating at 1 cycle per second giving a 5 millivolt peak-to-peak output across resistor 62 into a 1,000 ohm input of a recorder which normally traces an 8 mil wide line as shown at 32 on a chart 34 moving 6 inches per hour, the test engine signals ranging from −50 millivolts to +50 millivolts. With the oscillator oscillating the width of the tracing becomes about 80 mils, as shown at 36, so that there is no mistaking the different traces.

The oscillator operated with a 2N 1302 transistor, a 12 volt power supply, and the following circuit constants:

resistors 52 both 6,900 ohms
resistor 53  10,000 ohms
resistor 56  1,000 ohms
resistor 54  58,000 ohms
capacitors 58 each 10 microfarads
capacitor 57   500 microfarads Stage 60 also used a type 2N 1302 transistor, resistor 61 having 4,700 ohms and resistor 62 10 ohms.

Other types of oscillators or signal generators can also be used. The marker signals need not be simple sine waves but can be fluctuations of other varieties, such as square wave, clipped sine wave, half-rectified sine wave and spike-shaped pulses. These signals can be unidirectional in that they move the trace writer to-and-fro only on one side of its normal position, or they can be bidirectional moving the trace writer to-and-fro on both sides of its normal position. The to-and-fro movements are preferably so close together that their traces merge together. In other words the wave length of the marker signals as measured on the trace is preferably no greater than twice the width of the normal trace line. Somewhat greater wave lengths can be used however.

The frequency or frequencies of the marker signals should be within the response capabilities of the tracing equipment. Thus a chart recorder that can move its pen transversely at a maximum speed of 1 inch per second will not follow sinusoidal signals varying at a rate of 300 cycles per second, so that marker signals should be of lower frequency, as for example not higher than about 6 cycles per second.

The amplitude of the marker signals should be such as to broaden the trace line a readily distinguishable amount. With chart recorders or other pen-type tracers that provide an ink trace, it is best to have the broadened trace at least about twice the width of the unbroadened trace. A broadening to four times the width is even less likely to be misread.

With cathode-ray tube tracers as used in oscilloscopes for example, the tracing velocity is much higher than for chart recorders, and the marker signals suitably adjusted. A cathode-ray trace can be as narrow as 2 mils and can be written as fast as 20,000 feet per second, so that a suitable marker signal can have a frequency of 100 kilocycles per second with a time axis such that a written wave length is 4 mils. Cathode-ray traces can also be photographed for record storage or for subsequent study.

The marker signal output need not be connected in series in the circuit supplying the tracing apparatus as illustrated in FIG. 2, but can be connected in parallel if desired, or can be applied to the tracing apparatus through an independent connection. For example the pen of a chart recorder can be connected for actuation by an electric circuit such as a self-balancing bridge, and also for vibration by a magnetic field of a winding carried by the pen. The marker signal can then be delivered to the winding while the signals to be traced are delivered to the bridge.

The test indicator need not be responsive to electrical signals, but can be operated by other forms of energy such as magnetic, acoustic or light signals. The marker signals used in such arrangements can then be in corresponding or different forms of energy. The marker signals can for example be electrical or magnetic where the trace responds to sound or light, or can be acoustic when the trace responds to electric signals.

The tracing can also differ by responding to electric current or electric voltage. In the construction of FIG. 1, for example, the chart recorder can be current-responsive in which event its input can be equipped with an E/I converter such as Transmation Inc., Model 330-T to change incoming voltage signals to suitable current variations.

The traces of the present invention can be further modified as by making them lighter or darker without changing their width. This provides another technique for distinguishing indications, and can be used with or without the trace-broadening technique. The marking can for example be arranged to have a written wave length that keeps the trace-widening lines from completely merging together in the trace. The resulting widened trace has small gaps and is somewhat lighter in appearance than a trace that is just as wide but in which the merging is complete. Square waves or sawtooth waves give larger gaps than sine waves that have the same written pulse length, and so are preferred for this aspect of the invention. However merely increasing the wavelength of any of these waves also makes very good differences in trace intensity.

Obviously many modifications and variations of the present invention are possible in the light of the above teachings. It is, therefore, to be understood that within the scope of the appended claims the invention may be practiced otherwise than as specifically described.

I claim:

1. In an automatic fuel testing apparatus having a test engine with a shift mechanism connected to selectably operate the engine on a test fuel or on a reference fuel, the engine being also connected with a chart recorder having a recording unit that makes a transverse line record of the test measurements of the respective fuels, the improvement according to which the connection to the chart recorder includes an auxiliary marker signal supply also connected to the shift mechanism to add a fluctuating signal of sufficient frequency to broaden the transverse line recording when the selector selects one of the fuels as compared to the line recorded when it selects the other fuel, and cause one recording unit to simultaneously record both the test measurement and the selected fuel.